United States Patent Office.

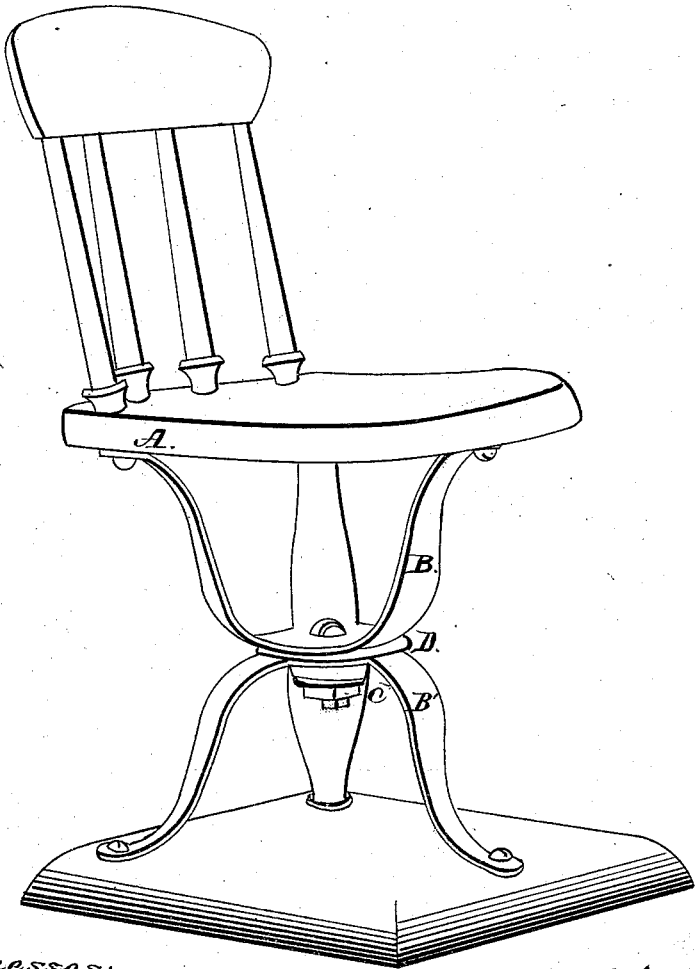

SAMUEL C. BROWN, OF RICHMOND, INDIANA, ASSIGNOR TO HIMSELF AND JAMES SMITH, OF SAME PLACE.

Letters Patent No. 70,319, dated October 29, 1867.

IMPROVED CHAIR FOR SCHOOLS, &c.

*The Schedule referred to in these Letters Patent and making part of the same.*

Be it known that I, SAMUEL C. BROWN, of Richmond, Wayne county, Indiana, have made a new and useful Improvement in Chairs for Schools and other uses; and that I do hereby declare that the following is a full and exact description of the construction thereof, reference being had to the accompanying drawings, in which Figure 1 is a perspective view, in which A represents the seat or chair. A' represents the floor. B and B' represent the legs or supports of the chair. C represents the bolt connecting the parts B and B'. D represents the elastic packing between the parts B and B'. E represents the elastic washer between the disk of the piece B and the nut C'.

In setting up the chair, B is screwed to the floor, and B' is screwed to the chair, or *vice versa*. The elastic packing D is placed between the parts B and B', and the bolt C is placed in position, connecting the disks of the pieces B and B'. The elastic washer E is placed between the nut C' and the disk of the piece B or B', as may be, the object being to relieve the seat of its rigidity, and also relieve the screws of the strain usually thrown upon them.

The holes through the top of the support B', and also through the bottom of the part B, through which the bolt C is intended to pass, must be made tapering towards the intermediate washer, so as to permit the oscillation of the seat without too great strain upon the bolt.

I wish to claim and secure by Letters Patent—

The combination of the seat-supports B and B' with the spring D, elastic washer E, and bolt C, and nut C', constructed and arranged to operate substantially as and for the purpose set forth.

SAMUEL C. BROWN.

Witnesses:
SAML. BELLIS,
WM. E. BELL.